US010474878B1

(12) United States Patent
Martin et al.

(10) Patent No.: US 10,474,878 B1
(45) Date of Patent: *Nov. 12, 2019

(54) OBJECT DETECTION IN VIDEOS

(71) Applicant: MorphoTrust USA, LLC, Billerica, MA (US)

(72) Inventors: Brian K. Martin, McMurray, PA (US); Brian Bertan, Merrick, NY (US)

(73) Assignee: MorphoTrust USA, LLC, Billerica, MA (US)

(*) Notice: Subject to any disclaimer, the term of this patent is extended or adjusted under 35 U.S.C. 154(b) by 203 days.

This patent is subject to a terminal disclaimer.

(21) Appl. No.: 15/730,854

(22) Filed: Oct. 12, 2017

Related U.S. Application Data

(63) Continuation of application No. 14/984,387, filed on Dec. 30, 2015, now Pat. No. 9,830,503.

(60) Provisional application No. 62/098,881, filed on Dec. 31, 2014.

(51) Int. Cl.
G06K 9/00 (2006.01)
G06T 7/20 (2017.01)

(52) U.S. Cl.
CPC ..... *G06K 9/00255* (2013.01); *G06K 9/00744* (2013.01); *G06K 9/00771* (2013.01); *G06T 7/20* (2013.01); *G06T 2207/10016* (2013.01); *G06T 2207/20076* (2013.01)

(58) Field of Classification Search
CPC ............. G06T 2207/10016; G06T 7/20; G06T 2207/20076; G06K 2009/00738; G06K 9/00255; G06K 9/00744; G06K 9/00771
See application file for complete search history.

(56) References Cited

U.S. PATENT DOCUMENTS

| | | | | |
|---|---|---|---|---|
| 8,571,272 B2* | 10/2013 | Gokturk | ................. | G06K 9/621 |
| | | | | 382/115 |
| 8,687,078 B2* | 4/2014 | Bigioi | ................ | G06K 9/00288 |
| | | | | 348/222.1 |
| 8,886,953 B1* | 11/2014 | Sipe | ........................ | G06F 21/32 |
| | | | | 713/186 |
| 9,177,130 B2 | 11/2015 | Nechyba et al. | | |
| 2002/0159627 A1* | 10/2002 | Schneiderman | ..... | G06K 9/3241 |
| | | | | 382/154 |
| 2003/0044045 A1* | 3/2003 | Schoepflin | ................ | G06T 7/12 |
| | | | | 382/103 |
| 2004/0240542 A1* | 12/2004 | Yeredor | ............. | G06K 9/00771 |
| | | | | 375/240.01 |
| 2006/0244826 A1* | 11/2006 | Chew | .................... | G01S 3/7865 |
| | | | | 348/143 |

(Continued)

*Primary Examiner* — Shaghayegh Azima
(74) *Attorney, Agent, or Firm* — Fish & Richardson P.C.

(57) ABSTRACT

Methods, systems, and apparatus, including computer programs encoded on a computer storage medium, for receiving a video feed of a scene. Selecting a first portion of the video feed and a second portion of the video feed based on a probability of an object being present in the first portion of the video feed compared to a probability of the object being present in the second portion of the video feed. Processing a first portion of the video feed using a first detection algorithm to detect the object in the first portion of the video feed. Processing a second portion of the video feed using a second detection algorithm to detect the object in the second portion of the video feet, where the first detection algorithm is different from the second detection algorithm.

15 Claims, 7 Drawing Sheets

(56) References Cited

U.S. PATENT DOCUMENTS

| | | | | |
|---|---|---|---|---|
| 2009/0328237 A1* | 12/2009 | Rodriguez | .......... | H04N 21/8352 726/32 |
| 2010/0123830 A1* | 5/2010 | Vunic | ................ | G06K 9/00711 348/700 |
| 2010/0265344 A1* | 10/2010 | Velarde | .................. | H04N 5/232 348/208.16 |
| 2011/0151934 A1* | 6/2011 | Geng | ...................... | H04M 1/67 455/565 |
| 2013/0051678 A1 | 2/2013 | Weng et al. | | |
| 2013/0272565 A1* | 10/2013 | Fagundes | .............. | H04M 3/523 382/100 |
| 2014/0003663 A1* | 1/2014 | Li | ...................... | G06K 9/00281 382/103 |
| 2014/0193035 A1* | 7/2014 | Ryu | ....................... | G06T 7/251 382/103 |
| 2014/0247347 A1* | 9/2014 | McNeill | ................... | H04N 7/18 348/143 |
| 2014/0314212 A1* | 10/2014 | Bentley | ............... | H04M 3/5116 379/38 |
| 2014/0316293 A1* | 10/2014 | Ahmad | ................. | A61B 5/024 600/508 |
| 2015/0288857 A1* | 10/2015 | Fay | ...................... | H04N 5/2251 348/36 |
| 2015/0288928 A1* | 10/2015 | McCoy | ................... | H04N 5/44 348/143 |
| 2016/0189162 A1* | 6/2016 | Taira | ...................... | G06Q 30/01 705/44 |

* cited by examiner

OBJECT DETECTION IN VIDEOS

CROSS-REFERENCE TO RELATED APPLICATION

This application is a continuation of U.S. patent application Ser. No. 14/984,387 filed Dec. 15, 2015 which claims the benefit of U.S. Provisional Application No. 62/098,881, filed on Dec. 31, 2014. The contents of which are incorporated herein by reference in their entirety.

TECHNICAL FIELD

This application generally relates to computer-based video analysis.

BACKGROUND

Video surveillance systems are commonly used in many applications. In some cases, video surveillance systems incorporate object detection algorithms (e.g., facial detection algorithms), however, such algorithms frequently fail to detect some of the objects in a video scene. Furthermore, the computing resources of some surveillance systems may prohibit the use of improved algorithms that, although more accurate, also may require additional computing resources.

SUMMARY

Implementations of the present disclosure include methods for selectively applying multiple object detection algorithms to a video feed based on object detection probability models. In some implementations, methods include the actions of receiving a video feed of a scene. Selecting a first portion of the video feed and a second portion of the video feed based on a probability of an object being present in the first portion of the video feed compared to a probability of the object being present in the second portion of the video feed. Processing a first portion of the video feed using a first detection algorithm to detect the object in the first portion of the video feed. Processing a second portion of the video feed using a second detection algorithm to detect the object in the second portion of the video feet, where the first detection algorithm is different from the second detection algorithm. Other implementations of this aspect include corresponding systems, apparatus, and computer programs, configured to perform the actions of the methods, encoded on computer storage devices. These and other implementations can each optionally include one or more of the following features.

In some implementations, the second detection algorithm is more computationally intensive than the first detection algorithm and the probability of the object being present in the second portion of the video feed is greater than the probability of the object being present in the first portion of the video feed.

In some implementations, the first portion of the video feed can be a first set of frames and the second portion of the video feed is a second set of frames.

In some implementations, the first portion of the video feed can be a first region of the scene and the second portion of the video feed is a second region of the scene.

In some implementations, the first portion of the video feed can be a first region of the scene in a series of frames and the second portion of the video feed can be a second region of the scene in the series of frames.

In some implementations, the first portion of the video feed can be a first region of the scene in a series of frames and the second portion of the video feed can be a second region of the scene in the series of frames. Selecting the first portion of the video feed and the second portion of the video feed can include determining a budget of available computing resources, and selecting a size of the first region and a size of the second region based on the budget of available computing resources.

In some implementations, the method includes obtaining a probability model of the scene in the video feed, wherein the probability model is based on historical detections of the object within the scene, and determining the probability of the object being present in the first portion of the video feed and the probability of the object being present in the second portion of the video feed based on the probability model of the scene in the video feed.

In some implementations, the probability model can include probabilities of detecting the object mapped to regions within the scene.

In some implementations, the method includes detecting the object in the video feed, and in response to detecting the object, modifying the probability model based on a region within the scene in which object was detected.

In some implementations, the probability model includes a spatial probability model, that maps probabilities of detecting the object to regions within the scene, and a temporal probability model that maps probabilities of detecting the object to time periods.

In some implementations, the method includes detecting motion in a first frame of the video feed, and determining, based on the detected motion in the first frame, the probability of the object being present in a second frame of the video, where the second frame is selected as the second portion of the video feed.

In some implementations, the method includes detecting the object in a region of a first frame of the video feed, and selecting the first portion of the video feed and the second portion of the video feed includes selecting the second portion of the video feed to include a region of a second frame that is proximate to the region of the first frame, where the second frame is subsequent in time to the first frame.

In some implementations, the first portion includes the second portion.

In some implementations, the object is a face, the first detection algorithm is a first facial detection algorithm, and the second detection algorithm is a second facial detection algorithm.

In some implementations, the video feed can be a live video feed.

In some implementations, the video feed can be a recorded video feed.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say, methods in accordance with the present disclosure are not limited to the combinations of aspects and features specifically described herein, but also can include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
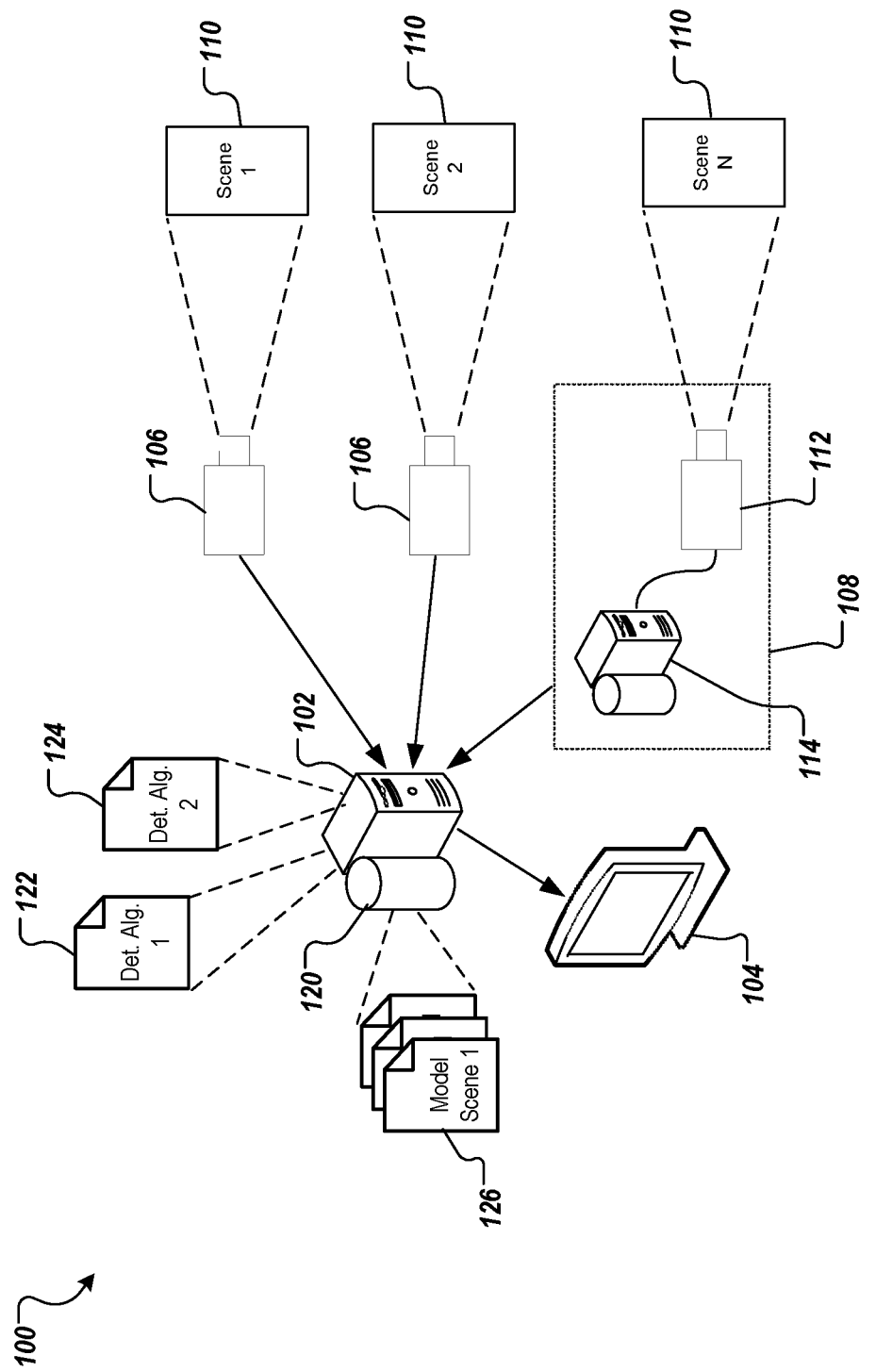
FIG. 1 depicts an exemplary system that can perform implementations of the present disclosure.

Implementations of the present disclosure include methods for selectively applying multiple object detection algorithms to a video feed. More particularly, implementations of the present disclosure are directed to improving object recognition in resource limited systems by selectively applying a computationally intensive (and more accurate) object detection algorithm to some portions of a video feed, and a less computationally intensive object detection algorithm to other portions of the video feed. In some examples, the more computationally intensive object detection algorithm is applied to regions of a video scene in which the object is likely to be present. In some examples, the regions of the scene in which the object is likely to be present are determined based on a probability model of historical object detections within the scene.

In some examples, the more computationally intensive object detection algorithm is applied to frames of the video feed in which the object is likely to be present in the video scene. In some examples, the frames in which the object is likely to be present are determined based on a probability model of historical detections of the object in time (e.g., times of the day in which the object is likely to be present in the scene). In some examples, the fames in which the object is likely to be present are determined based on a detection of the object in a previous frame of the video.

In some examples, the more computationally intensive object detection algorithm is applied to regions of the video scene within selected frames of the video feed. In other words, the more computationally intensive object detection algorithm can be selectively applied both spatially and temporally to a video feed.

More specifically, in some examples, the computationally intensive object detection algorithm can be performed in particular spatial portions of a video feed. For example, the computationally intensive algorithm can be performed only on pixels in particular regions of each frame in the video feed. In some examples, the computationally intensive object detection algorithm can be performed on temporal portions of a video feed. For example, the computationally intensive algorithm can be performed only on particular frames of the video feed (e.g., for frames occurring during a particular time period). In some examples, the computationally intensive object detection algorithm can be performed on portions of a video feed that are selected both spatially and temporally. For example, the computationally intensive object detection algorithm can be performed on particular spatial portions of a video feed (e.g., regions of video frames) for each frame of a subset of video frames (e.g., for frames occurring during a particular time period).

Implementations of the present disclosure may improve object detection in systems with limited resources by selectively applying computationally intensive detection algorithms to fine tune the detection sensitivity of a surveillance system. For example, it may be an uneconomical use of computing resources to perform the computationally intensive detection algorithms on portions of video feeds in which object detections are unlikely to occur. Furthermore, implementations of the present disclosure may make more efficient use of computing resources while improving the overall reliability of automatic object detection systems.

Implementations of the present disclosure will be discussed in further detail with reference to an example context. The example context includes an automatic facial detection system for a video surveillance. It is appreciated, however, that implementations of the present disclosure can be realized in other appropriate contexts, for example, object detection or tracking systems (e.g., detection systems for other objects, such as packages), license plate detection in traffic camera monitoring systems, weapon detection in surveillance video, and contraband detection in video from X-ray imaging systems (e.g., airport luggage scanners).

As used herein, the terms "computationally intensive" or "high-cost" in reference to detection algorithms refer to the computational complexity of an algorithm. In some configurations, the terms "computationally intensive" or "high-cost" can refer to the computational complexity of an algorithm as measured in approximate polynomial terms with respect to the number of input operands (e.g., 1,000-10,000 input operands). Moreover, the notion of "computationally intensive" or "high-cost" may vary based on the computing power of a given computing system. For example, in some configurations the terms "computationally intensive" or "high-cost" can refer to the computational complexity of an algorithm as measured by the amount of a system's computing resources (e.g., processing power and memory) required to execute the algorithm. A "computationally intensive" or "high-cost" algorithm requires the use of more of a system's computing resources than a "computationally low-cost" or "low-cost" algorithm.

As used herein, the term "computationally low-cost" or "low-cost" in reference to detection algorithms refer to the computational complexity of an algorithm. In some configurations, the terms "computationally low-cost" or "low-cost"" can refer to the computational complexity of an algorithm as measured in approximate polynomial terms with respect to the number of input operands (e.g., 100-1, 000 input operands). Moreover, the notion of "computationally low-cost" or "low-cost" may vary based on the computing power of a given computing system. For example, in some configurations the terms "computationally low-cost" or "low-cost" refer to the computational complexity of an algorithm as measured by the amount of a system's computing resources (e.g., processing power and memory)

required to execute the algorithm. A "computationally low-cost" or "low-cost" algorithm requires the use of fewer of a system's computing resources than a "computationally intensive" or "high-cost" algorithm.

As used herein, the term "real-time" refers to transmitting or processing data without intentional delay given the processing limitations of a system, the time required to accurately obtain data and images, and the rate of change of the data and images. In some configurations, "real-time" is defined as concurrently processing a video feed as the system receives the video feed from a live or recorded video source. Although there may be some actual delays, the delays are generally imperceptible to a user.

FIG. 1 depicts an example system 100 that can perform implementations of the present disclosure. In some examples, the system 100 can be a video surveillance system. The system 100 includes a video processing device 102, a display device 104, video input components 106, and a video input component 108. As discussed herein, the video processing device 102 can receive video feeds from one or more video input components 106, 108 and selectively apply two or more facial detection algorithms 122, 124 to different spatial and/or temporal portions of the video feeds. For example, facial detection algorithm 122 can be a low-cost facial detection algorithm, and detection algorithm 124 can be a high-cost facial detection algorithm. In other words, facial detection algorithm 124 can be a more computationally intensive facial detection algorithm than facial detection algorithm 122.

In some examples, the video processing device 102 can include one or more computing devices that can execute the facial detection algorithms 122, 124. For example, the video processing device 102 includes one or more servers, desktop computers, laptop computers, tablet computers, and other appropriate devices. In some examples, the video processing device 102 includes one or more electronic storage devices 120. In some examples, the electronic storage devices 120 store probability models 126 for determining how to apply the facial detection algorithms 122, 124 to the video feeds.

In some examples, the algorithms 122, 124 can be facial detection algorithms that include segmentation techniques to detect images of faces from the video feeds. The segmentation can include shape templates that can be used in transforms. In some examples, the algorithms 122, 124 can employ segmentation and classification approaches for face detection including, for example, neural network classifiers, Gabor transforms, or wavelet transforms. In some examples, the facial detection algorithms 122, 124 can employ image processing techniques to accommodate noisy images in the video feeds.

In some examples, the probability models 126 are probability models of scenes 110 captured by the video feeds. For example, the probability models 126 can model the probability of detecting faces within a scene 110 of a video feed. In some examples, the probability models 126 can be generated based on historical detections of faces within various regions of a scene 110 and/or at different times within a scene 110. For example, the probability models 126 can map facial detection probabilities based on historical facial detection data to various regions within a scene 110. In some examples, the probability models 126 can be associated with particular scenes 110.

In some examples, the probability models 126 can be updated based on new facial detections within a scene 110. For example, the probability model 126 associated with a particular scene 110 can be updated when the video processing device 102 detects faces within a video feed of the particular scene 110. In other words, in some implementations, the probability model 126 can be a learned probability model. Furthermore, in some implementations, the probability model 126 can be generated and updated using a computer learning model.

In some implementations, one or more of the probability models 126 can be algorithm specific. For example, an algorithm specific probability model can model the probability of detecting objects in a scene using a particular algorithm. For example, the probability models 126 may indicate that one facial detection algorithm has a higher probability of detecting faces in a side pose (e.g., profile) within a scene and that another algorithm has a higher probability of detecting faces in a front pose (e.g., front facing) within a scene.

In some examples, the video processing device 102 can include or be coupled with one or more display devices 104 (e.g., an liquid crystal display (LCD), a cathode-ray tube (CRT) display, or a light emitting diode (LED) display).

Video input components 106, 108 are communicably coupled with the video processing device 102 to provide video feeds of respective scenes 110 to the video processing device 102. In some examples, the video input components 106, 108 can be coupled with the video processing device 102 through a network. For example, video input components 106, 108 can include a network communication interface to communicate with the video processing device 102 through a network. The network can include a network or combination of networks, such as a local area network (LAN), wide area network (WAN), the Internet, analog or digital wired and wireless telephone networks (e.g., 4G and Long-Term Evolution (LTE) networks), a satellite network, one or more wireless access points (e.g., WiFi), or any appropriate combination thereof connecting any number of mobile clients, fixed clients, and servers. In some examples, the video feeds provided by the video input components 106, 108 include images captured at a frame rate greater than 20 frames per second (fps), for example, 24 fps, 30 fps, or 48 fps. In some examples, the video feeds can have a frame rates less than 20 fps, for example, 11-19 fps, 6-10 fps, or 5 fps or less. In some examples, the frames of the video feed are digitized for downstream digital processing. In some examples, the images in the frames can have a spatial resolution of, for example, 800×600 pixels, 1024×768 pixels, 1152×864 pixels, or 128051024 pixels.

In some examples, video input components 106 provide "live" or "real-time" video feeds. In some examples, "live" or "real-time" video feeds are defined as video feeds that are provided by a video input component 106 without intentional delay from when the video images are captured. In other words, the "live" or "real-time" video feeds are not provided from a video imaging device and not from a prior recording of a video. In some examples, the video input components 106 are video imaging devices (e.g., video cameras, infrared cameras, charge-coupled devices (CCD's), IP cameras, or other appropriate devices). In some examples, the imaging devices can be pan zoom tilt (PZT) devices.

In some examples, video input component 108 provides recorded video feeds. In other words, video input component 108 provides video feeds that were obtained by a video imaging device 112 and stored in a digital or physical video storage format (e.g., MPEG, DVD, Blu-ray Disc, etc.). The video input component 108 can include a video imaging device 112 and a video storage device 114. The video storage device can be, for example, a computing device (e.g., a server) with electronic storage (e.g., computer memory or a CD/DVD writeable drive). In some examples, the video imaging device 112 can be, for example, a video camera, infrared camera, CCD, an IP camera, or other appropriate device. In some examples, the imaging device 112 can be a PZT device.

Figure 2A:
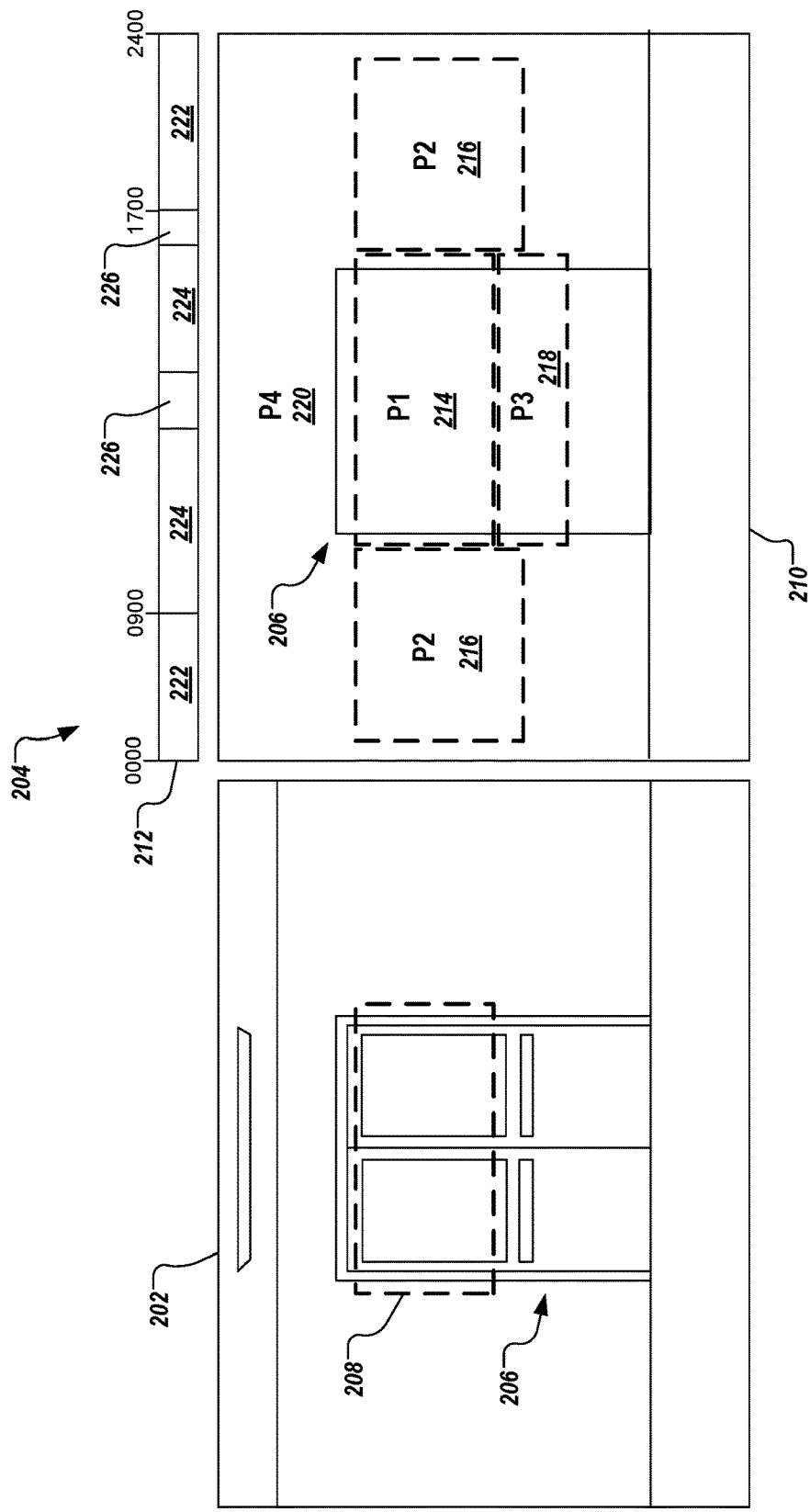
FIGS. 2A-2C depict graphical representations of exemplary video feed scenes and probability models in accordance with implementations of the present disclosure.
Figure 2B:
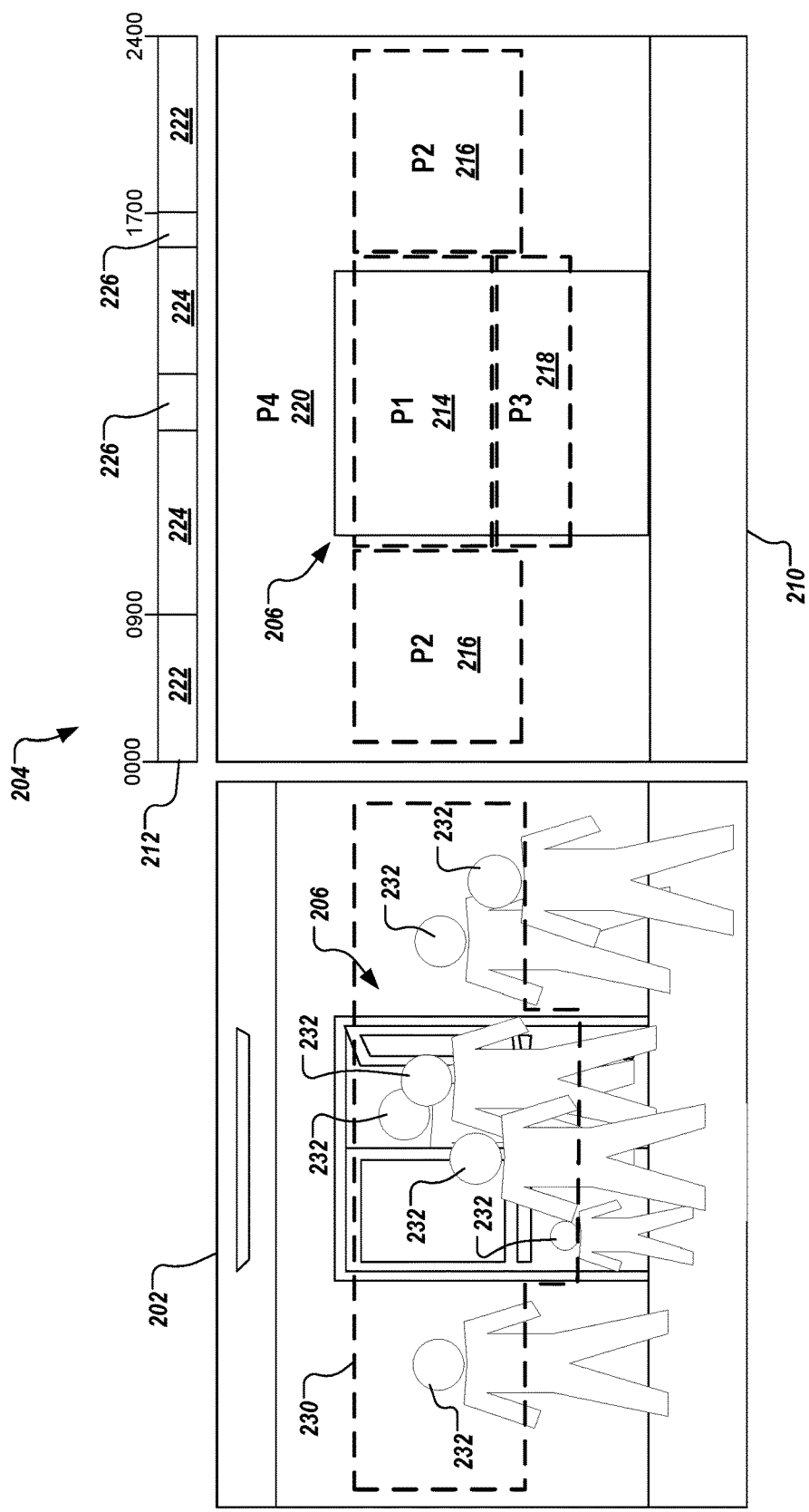
Figure 2C:
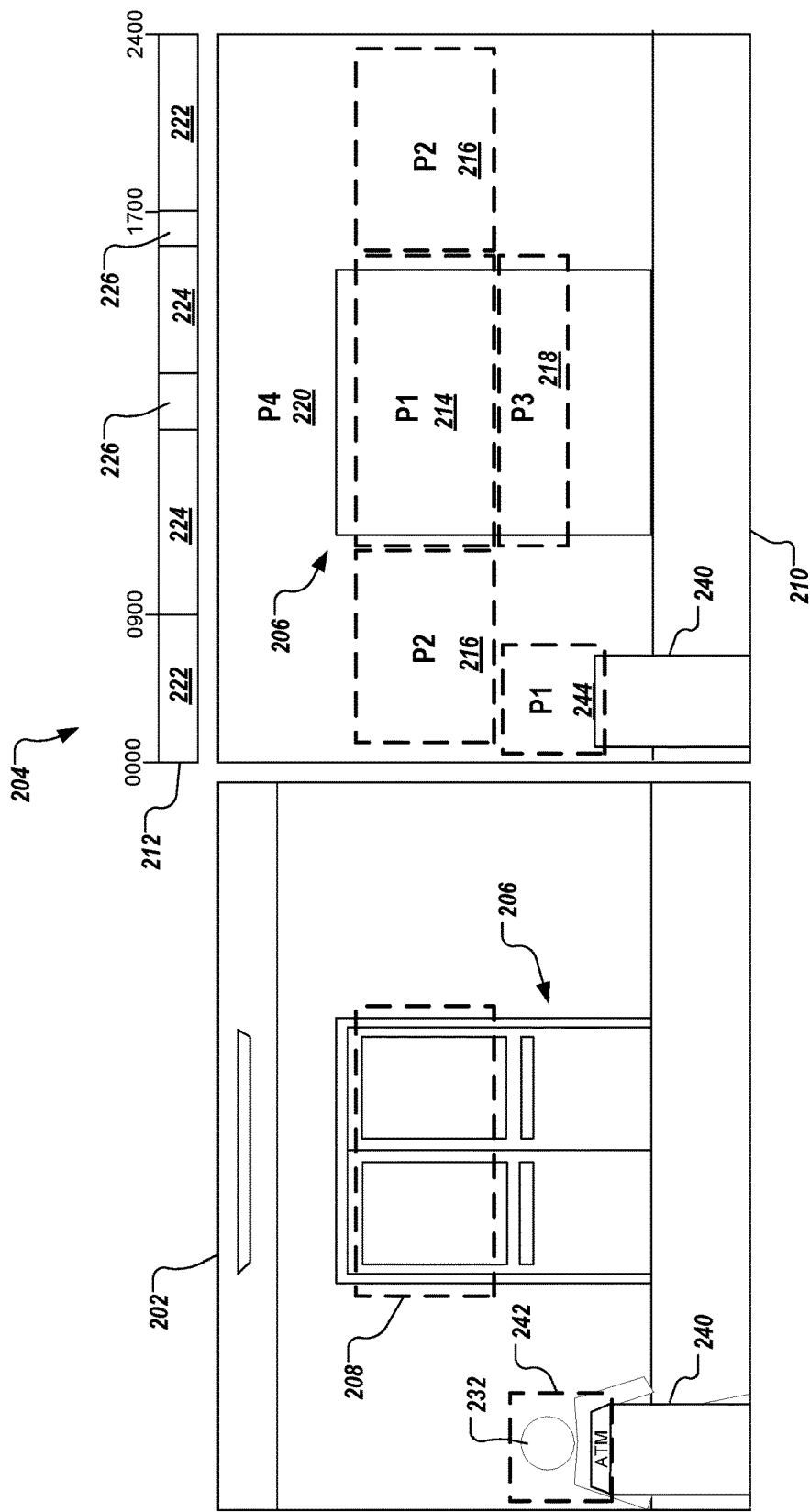

FIGS. 2A-2C depict graphical representations of exemplary video feed scenes and probability models in accordance with implementations of the present disclosure. More specifically, FIGS. 2A-2C provide graphical representations of several exemplary techniques for selectively applying two or more facial detection algorithms to a video feed.

FIG. 2A shows an example video feed scene 202 and a graphical representation of an example probability model 204 of the scene 202 that includes a doorway 206 to a building. As described above, a video processing device (e.g., video processing device 102 of FIG. 1) can process the video feed of the scene 202 using a low-cost facial detection algorithm and a high-cost facial detection algorithm. For example, the video processing device can select a portion of the video feed on which to perform the high-cost algorithm to adequately manage the computing resources of the video processing device. For example, the video processing device can select one or more regions of interest (ROIs) 208 within the scene 202 in which to perform the high-cost algorithm. The ROIs 208 can be regions of the scene 202 in which faces are likely to be detected. For example, the ROIs 208 can include areas of a scene near an entryway (e.g., doorway 206), a cashier, or an automatic teller machine (ATM).

In some examples, the video processing device performs the high-cost facial detection algorithm on a portion of the video feed including the ROI 208 of the scene 202 and the low-cost facial detection algorithm on the remainder of the scene 202 outside of the ROI 208. In some examples, the low-cost algorithm is performed on the entire video feed of the scene 202 (including ROI 208) and the high-cost algorithm is performed on only portion of the video including the ROI 208.

In some examples, the ROI 208 can be defined within images of the video feed by reference to objects (e.g., stationary objects such as doorway 206) in the background of the scene 202. In other words, the video processing device can, for example, select a region of pixels associated with ROI 208 based on a relative location of the region of pixels to the doorway 206 within images of the scene 202. In addition, the region of pixels can be selected with appropriate dimensions to encompasses the ROI 208 in the scene 202.

In some examples, the ROI 208 can be defined within images of the video feed by reference to a selected regions of pixels within frames of the video feed that corresponds to the location of the ROI 208 in the scene 202. For example, if a scene 202 of a video feed is stationary (e.g., the imaging device is stationary), the ROI 208 can be defined without reference to background objects in the scene but with reference to the location of pixels within the frame. In other words, the video processing device can, for example, select a region of pixels associated with ROI 208 based on an absolute location of the region of pixels within frames of the video feed because the scene 202 remains stationary (e.g., the imaging device does not pan/tilt/zoom). In addition, the region of pixels can be selected with appropriate dimensions to encompasses the ROI 208 in the scene 202.

In some examples, an ROI 208 can be selected by locating predefined objects within a scene. For example, an ROI 208 can be selected as an area around an object near which faces are likely to be detected (e.g., entryways, ATMs, cashiers, etc.).

In some examples, an ROI 208 can be selected based on a probability model 204 of the scene 202. A facial detection probability model 204 can be generated based on historical facial detection data associated with the scene 202. In some examples, a probability model 204 can include a spatial probability model 210 and a temporal probability model 212 associated with the scene.

For example, the spatial probability model 210 can map probabilities of detecting a face to corresponding regions 214, 216, 218, 220 of the scene 202. Each region 214, 216, 218, 220 can have corresponding probability (P1, P2, P3, P4) representing the likelihood of that a face will be detected in the region. For example, P1 represents the likelihood that a face will be detected in region 214, P2 represents the likelihood that a face will be detected in regions 216, P3 represents the likelihood that a face will be detected in region 218, and P4 represents the likelihood that a face will be detected in region 220 (e.g., the remainder of the scene outside of regions 214, 216, and 218). In some examples, the probabilities (P1, P2, P3, P4) can be determined based on comparing the number of facial detections within each corresponding region to the total number of historical facial detections within the video feed of the scene 202 (e.g., the total historical facial detections or the total historical facial detections over a period of time).

In addition, the size and shape of the regions 214, 216, 218, 220 can be determined based on historical facial detection data. For example, the regions 214, 216, 218, 220 can be defined based on a spatial histogram of historical detection data (or calculated probabilities) mapped to locations in the scene 202. Thresholds associated with probability ranges (e.g., 1.0-0.9, 0.9-0.75, 0.75-0.5, <0.5) can then by applied to the histogram to define the regions 214, 216, 218, 220.

The temporal probability model 212 can map probabilities of detecting faces to corresponding frames of the video feed. In some examples, temporal probability model 212 can map probabilities of detecting faces to corresponding time periods that are associated with the frames of the video feed. For example, time periods can include, but are not limited to, times of the day (e.g., operating hours of a business, peak business hours, etc.), days of the week (e.g., less detections may be expected by a bank security camera on weekends than on weekdays), and/or scheduled events (e.g., public events, bus or train arrival/departure schedules).

For example, time period 222 may correspond to non-business hours and have a relatively low temporal probability (TP1) of detecting faces within the associated video feed frames. Time period 224 may correspond to normal business hours and have a relatively moderate temporal probability (TP2) of detecting faces within the associated video feed frames. Time period 226 may correspond to peak business hours and have a relatively high temporal probability (TP3) of detecting faces within the associated video feed frames. In some examples, the temporal probabilities (TP1, TP2, TP3) can be broad categories that represent the facial detection likelihood for a respective time period relative to other time periods (e.g., HIGH, MED, LOW). In some examples, the temporal probabilities (TP1, TP2, TP3) can be numeric probabilities representing the likelihood of detecting faces during respective time periods. For example, temporal probabilities (TP1, TP2, TP3) can be determined based on comparing the number of facial detections within each corresponding time period to the total number of historical facial detections within the video feed of the scene 202 (e.g., the total historical facial detections or the total historical facial detections over a period of time).

In addition, the beginning and end of each time period 222, 224, 226 can be determined based on historical facial detection data. For example, the regions 214, 216, 218, 220 can be defined based on a temporal histogram of historical detection data (or calculated probabilities) mapped to time increments (e.g., 1 min., 5 min., 30 min. or 60 min. increments). Thresholds associated with probability ranges (e.g., 1.0-0.9, 0.9-0.75, 0.75-0.5, <0.5) can then by applied to the histogram to define the time periods 222, 224, 226.

In some implementations, a video processing device can select ROIs 208, 230 on which to perform the high-cost facial detection algorithm based on the probability model 204. In some examples, the video processing device can select an ROI 208 based on a probability threshold. For example, the video processing device can compare the probabilities associated with regions 214, 216, 218, 220 to a probability threshold and define an ROI 208 based on a combination of one or more of the regions 214, 216, 218, 220 that have probabilities that meet and/or exceed the probability threshold. For example, as shown in FIG. 2A the probability P1 of region 214 may meet or exceed a probability threshold value, while the probabilities of regions 216, 218, and 220 (P2, P3, P4) may not meet or exceed the probability threshold value. Thus, the ROI 208 is defined to include only region 214 from the probability model 204.

In some implementations, the ROI 208 can be modified for different frames of the video feed (e.g., during different time periods). In some examples, the ROI 208 can be modified based on the temporal probability model 212 of the scene 202. For example, FIG. 2B depicts the scene 202 during peak business hours (e.g., time period 226). In the example shown, the ROI 208 of FIG. 2A has been expanded to the ROI 230 to account for the higher likelihood of detecting customers' faces 232 during this time period.

In some implementations, the ROI can be modified (e.g., expanded or contracted) by modifying the probability threshold value based on the temporal probabilities. For example, during time periods of low facial detection probability (e.g., time period 222 and FIG. 2A), the probability threshold value can be set to a relatively high value (e.g., 0.9) to reduce the number of regions of the spatial probability model 210 used to define an ROI 208. During time periods of high facial detection probability (e.g., time period 226 and FIG. 2B), the probability threshold value can be set to a relatively low value (e.g., 0.5) to increase the number of regions of the spatial probability model 210 used to define an ROI 230.

In some implementations, the ROI can be modified (e.g., expanded or contracted) by combining the spatial probability model 210 with the temporal probability model 212. In some examples, the temporal probability model 212 can be used to weight the spatial probability model 210. For example, during time periods of low facial detection probability (e.g., time period 222 and FIG. 2A), the probabilities associated with each region 214, 216, 218, 220 (P1, P2, P3, P4) can be weighted by temporal probability (TP1) associated with the present time period (e.g., time period 222). Thus, as shown in FIG. 2A, weighting the region probabilities (P1, P2, P3, P4) by TP1 may reduce the probabilities of all of the regions below the probability threshold except for region 214, resulting in ROI 208.

Similarly, for example, during time periods of high facial detection probability (e.g., time period 226 and FIG. 2B), the probabilities associated with each region 214, 216, 218, 220 (P1, P2, P3, P4) can be weighted by temporal probability (TP3) associated with the present time period (e.g., time period 226). Thus, as shown in FIG. 2B, weighting the region probabilities (P1, P2, P3, P4) by TP3 may raise the probabilities of all of the regions 214, 216, 218, 220 above the probability threshold, resulting in ROI 230.

In some implementations, a video processing device can select ROIs 208, 230 on which to perform the high-cost facial detection algorithm based on the probability model 204 and a budget of computing resources available. For example, the probability model 204 can be used to develop a computing resource cost model. For example, the cost model can be developed by determining a cost (in computing resources) associated with performing the high-cost facial detection algorithm on each region (214, 216, 218, 220) or time period (222, 224, 226) of the probability model 204. For example, the region 214 may have a greater computational cost than region 218 because region 214 encompasses a greater area of the scene 202 (e.g., a greater number of pixels). The video processing device can use the cost model to efficiently allocate computing resources. In some examples, a computing device can optimize the use of the available computing resources by using the cost model to select an ROI that includes as many regions of the probability model as the available computing resources can accommodate at a given time. In such examples, the video processing device can prioritize regions of the probability model for inclusion in the ROI—and, consequently, processing with the high-cost model—based on each region's probability.

In some examples, the probability model can be updated over time, for example, to accommodate changes in facial detection probabilities due to changes in the scene 202. For example, as depicted in FIG. 2C, an ATM 240 has been added to the scene 202. The addition of the ATM 240 may result in an increase in the likelihood of facial detections in an area 242 of the scene near the ATM 240. In response to an increased number of facial detections in the area 242 near the ATM 240 (e.g., a customer's face 232), the probability model 204 can be updated to include a new region 244 with a probability of detecting faces of P1. For example, the region 244 can be automatically defined based updating the spatial histogram to include new facial detection data. The updated histogram may account for the increased number of detections in that region 244 of the scene 202. Consequently, the region 244 can be automatically defined based on falling within an appropriate threshold probability range used to define the regions of the spatial probability model 210 (e.g., a probability range associated with probability P1).

In some examples, the probability model 204 can be generated or modified based on external data in addition to the facial detection data. For example, public transportation data can be used to generate or modify a temporal probability model 212 associated with a scene of a bus stop or train station. The public transportation data can be, for example, a bus or a train arrival and departure schedule.

Figure 3:
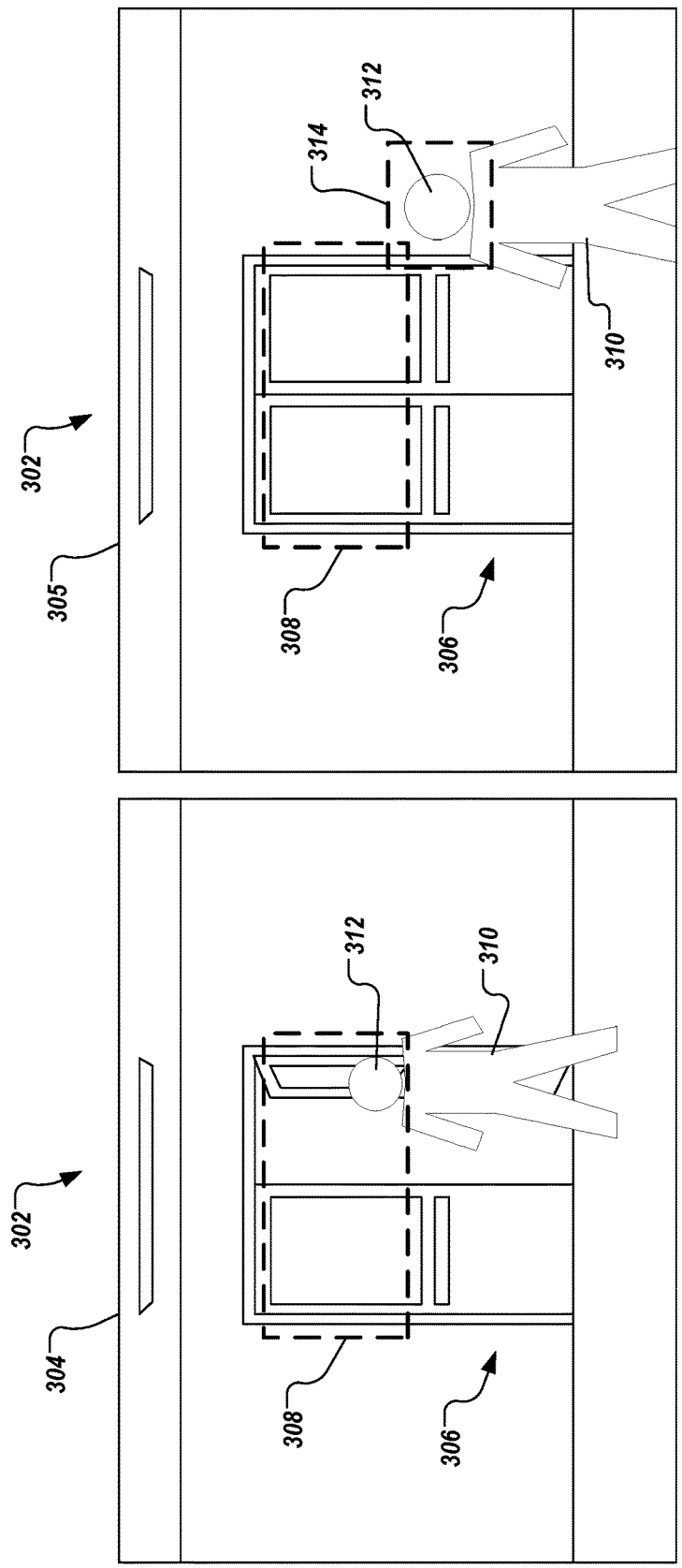
FIG. 3 depicts a graphical representations of an exemplary video feed scene in accordance with implementations of the present disclosure.

FIG. 3 depicts a graphical representations of an exemplary video feed scene in accordance with implementations of the present disclosure. More specifically, FIG. 3 depicts a first frame 304 of a video feed scene 302 and a second frame 305 of the video feed scene 302. In both frames 304, 305, the scene 302 includes a doorway 306, an ROI 308 in which the high-cost facial detection algorithm is performed, and a customer 310. As shown, frame 305 is subsequent in time to frame 304, although frames 304 and 305 are not necessarily consecutive.

In frame 304 a video processing device detects the customer's 310 face 312 within the ROI 308, for example, using the high-cost facial detection algorithm. In some implementations, the video processing device can select a second ROI (e.g., ROI 314 of frame 305) for a second frame (e.g., frame 305), in response to detecting a face in a first frame (e.g., frame 304). For example, as depicted in frame 305, the video processing device can determine an ROI 314 for use in frame 305 based on determining a likely location of a detected face 312 in the subsequent frame (frame 305). For example, the location of the detected face in frame 304 may be proximate to the location at which it will appear in frame 305. Thus, the ROI 314 can be selected in a location proximate to where the face was detected in a prior frame (e.g., frame 304). In some examples, the video processing device can use a tracking algorithm to determine, for example, based on motion of the face between frames, areas of subsequent frames in which the face 312 is likely to be detected, and select an ROI 314 corresponding to such areas. Furthermore, the video processing device can apply the high-cost facial detection algorithm to ROI 314 to, for example, track the face 312 with an increased level of accuracy.

In some examples, frames 304 and 305 may represent sets of multiple frames. For example, it may take multiple frames of a video feed to detect a face and predict the location of the face in future frames. In some examples, an ROI can be generated in a similar manner even if a face is not detected. For example, an ROI can be generated for subsequent frames based on detecting motion in first set of frames. For example, an ROI can be selected for a region of a scene in which a moving object is likely to be present in the subsequent frames. Applying the high-cost algorithm to an ROI selected in this manner may, for example, increase the likelihood of detecting a face in a region of the scene with an otherwise low probability of facial detections.

Figure 4:
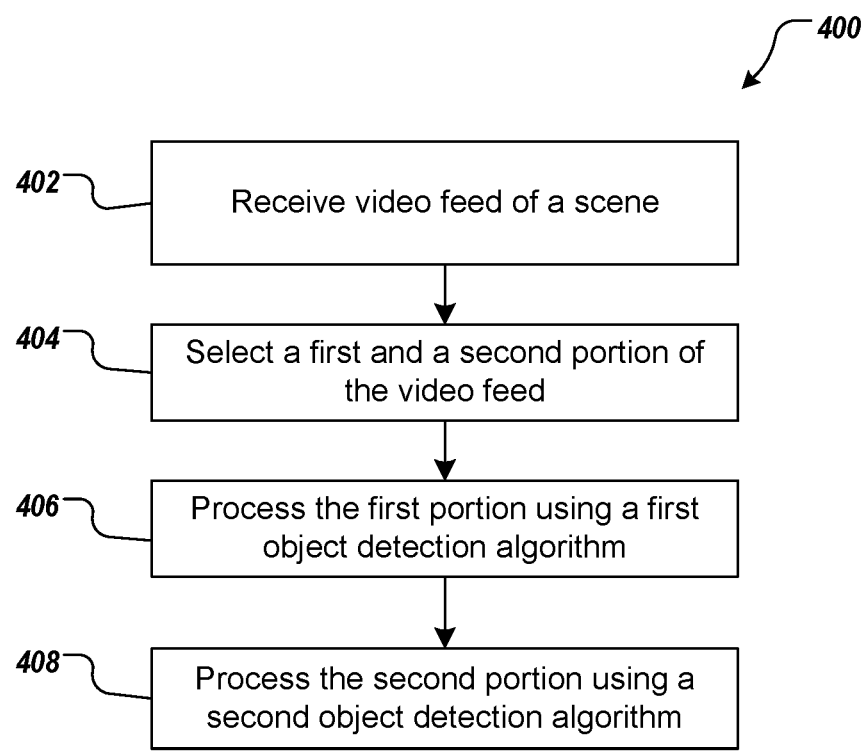
FIG. 4 depicts an exemplary process that can be executed in accordance with implementations of the present disclosure.

FIG. 4 is a flowchart illustrating an exemplary process 400 that can be executed in implementations of the present disclosure. In some implementations, the exemplary process 400 can be realized using one or more computer-executable programs that are executed using one or more computing devices. In some implementations, the exemplary process 400 can be executed by a video processing device, such as video processing device 102 of FIG. 1.

A video feed of a scene is received (402). For example, a video feed can be received from a video input component (e.g., video impute components 106, 108 of FIG. 1). The video feed can be a live video feed or a recorded video feed. A first portion of the video feed and a second portion of the video feed are selected (404). For example, the first and second portion of the video feed can be selected based on a probability of an object being present in the first portion of the video feed compared to a probability of the object being present in the second portion of the video feed. For example, the probability of the object being present in the second portion of the video feed may be greater than the probability of the object being present in the first portion of the video feed. In some examples, the probabilities can be determined from detection probability models.

The first portion of the video feed is processed using a first detection algorithm (406). For example, the first portion of the video feed can be processed using the first algorithm to detect the object in the first portion of the video feed. The second portion of the video feed is processed using a second detection algorithm (408). For example, the second portion of the video fed can be processed using the second algorithm to detect the object in the second portion of the video feed. The second detection algorithm can be a more computationally intensive ("higher-cost") algorithm than the first detection algorithm. For example, the more computationally intensive algorithm (the second algorithm) can be used to process the portion of the video with the higher probability of the object occurring (the second portion) in order to improve the overall object detection capability of a video processing system while maintaining efficient use of computing resources.

In some examples, the first portion includes the second portion of the video feed (e.g., the first portion can be the entire video feed). In some examples, the object can be a face, and the first and second algorithm can be facial detection algorithms.

In some examples, the first and second portions of the video feed can be selected based on a probability model of the scene. In some examples, the first and second portion of the video feed can be first and second regions within frames of the video feed. For example, the regions can encompass respective first and second sets of pixels in frames of the video feed. In some examples, the first and second portions of the video feed can be first and second sets of frames of the video feed. In some examples, the first and second sets of frames can represent first and second time periods.

In some examples, the first and second portions of the video feed can be selected based on the amount of computing resources available for processing video (e.g., a computing resource budget) and a computing resource cost model.

In some implementations, the first and the second algorithm can be different algorithms that are computationally similar. In other words, the second algorithm may not be not be more computationally intensive or, at least, not significantly more computationally intensive than the first algorithm. For example, the first algorithm and second algorithm can be different types of algorithms. For instance, the first algorithm can be an object detection algorithm and the second algorithm can be a facial detection algorithm. In some examples, the first algorithm and the second algorithm different algorithms configured to detect the same object, but be associated with different detection probabilities. For example, the first algorithm can be a facial detection algorithm that has a higher probability of detecting faces in a front pose (e.g., front facing) and the second algorithm can be a facial detection algorithm that has a higher probability of detecting faces in a side pose (e.g., facial profile). For example, in some implementations, one or more of the probability models can be algorithm specific. For example, an algorithm specific probability model can model the probability of detecting objects in a scene using a particular algorithm. For example, the probability models may indicate that the first facial detection algorithm has a higher probability of detecting faces in a front pose within a scene and that another algorithm has a higher probability of detecting faces in a side pose within a scene.

In some implementations, a video processing device can perform process 400 in real-time. For example, the process 400 can be performed in real-time on a live video feed as the video feed is being received. For example, the process 400 can be performed in real-time on a live or recorded video feed as the video is being displayed on a display device.

Figure 5:
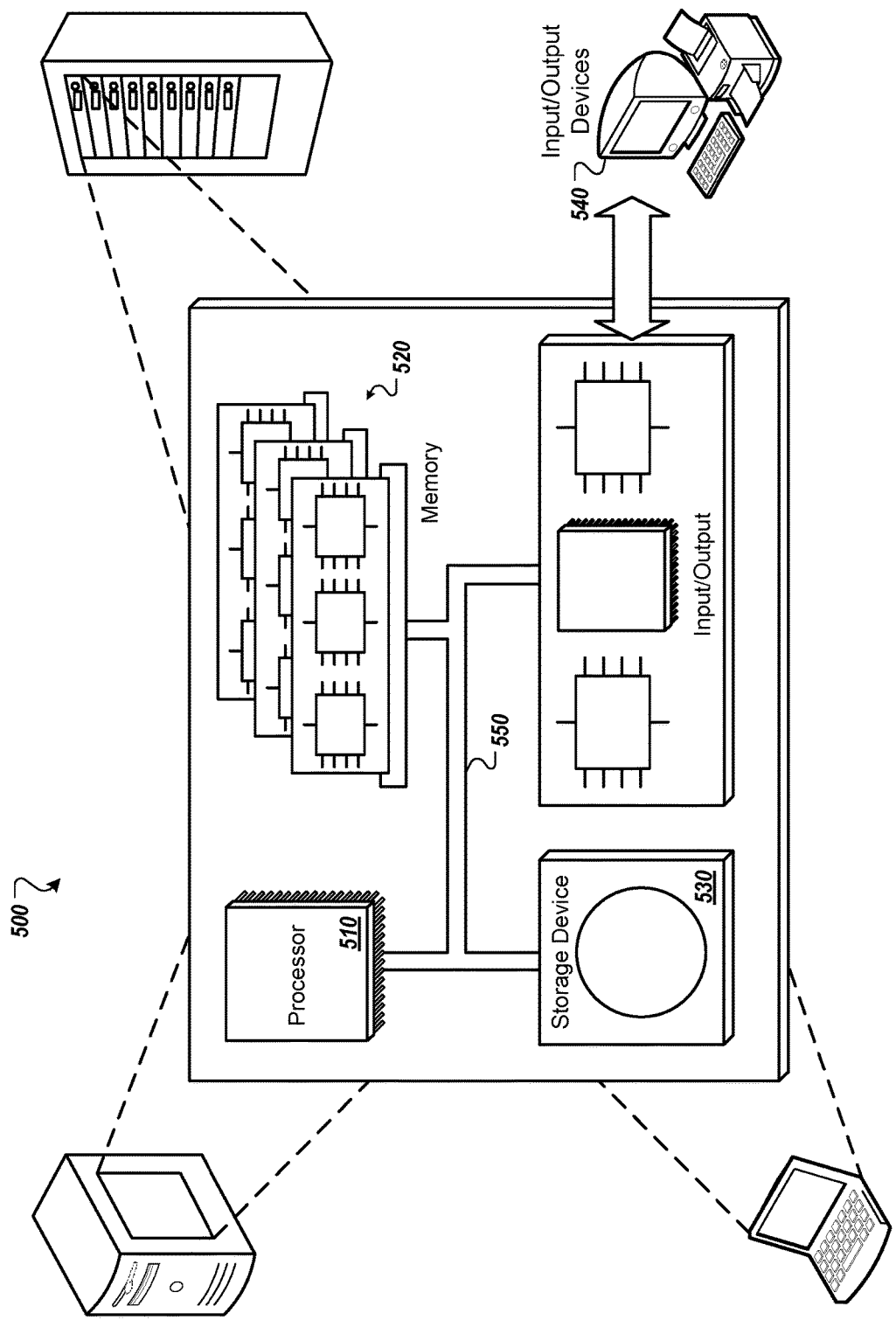
FIG. 5 is a schematic illustration of exemplary computer systems that can be used to execute implementations of the present disclosure.

FIG. 5 is a schematic illustration of example computer systems 500 that can be used to execute implementations of the present disclosure. The system 500 can be used for the operations described in association with the implementations described herein. For example, the system 500 may be included in any or all of the computing components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third party services, components, libraries, and such, as appropriate. Conversely, the features and functionality of various components can be combined into single components as appropriate The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few Computer readable media (transitory or non-transitory, as appropriate) suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for selectively applying multiple object detection algorithms, the method being executed by one or more processors and comprising:
    receiving, by the one or more processors, a video feed of a scene;
    obtaining, by the one or more processors, a probability model of the scene in the video feed, wherein the probability model is based on historical detections of an object within the scene;
    determining, by the one or more processors, a probability of the object being present in a first portion of the video feed and a probability of the object being present in a second portion of the video feed based on the probability model of the scene in the video feed;
    selecting, by the one or more processors, the first portion of the video feed and the second portion of the video feed based on the probability of the object being present in the first portion of the video feed compared to the probability of the object being present in the second portion of the video feed;
    wherein the probability of the object being present in the second portion of the video feed is greater than the probability of the object being present in the first portion of the video feed;
    processing, by the one or more processors, a first portion of the video feed using a first detection algorithm to detect the object in the first portion of the video feed; and
    processing, by the one or more processors, a second portion of the video feed using a second detection algorithm to detect the object in the second portion of the video feed,
    wherein the first detection algorithm is different from the second detection algorithm, and
    wherein the probability model includes a spatial probability model, that maps probabilities of detecting the object to regions within the scene, and a temporal probability model that maps probabilities of detecting the object to time periods.

2. The method of claim 1, wherein the first portion of the video feed is a first set of frames and the second portion of the video feed is a second set of frames.

3. The method of claim 1, wherein the first portion of the video feed is a first region of the scene and the second portion of the video feed is a second region of the scene.

4. The method of claim 1, wherein the first portion of the video feed is a first region of the scene in a series of frames and the second portion of the video feed is a second region of the scene in the series of frames.

5. The method of claim 1, wherein the first portion of the video feed is a first region of the scene in a series of frames and the second portion of the video feed is a second region of the scene in the series of frames, and
   wherein selecting the first portion of the video feed and the second portion of the video feed comprises:
   determining a budget of available computing resources; and
   selecting a size of the first region and a size of the second region based on the budget of available computing resources.

6. The method of claim 1, wherein the probability model includes probabilities of detecting the object mapped to regions within the scene.

7. The method of claim 1, further comprising:
   detecting the object in the video feed; and
   in response to detecting the object, modifying the probability model based on a region within the scene in which object was detected.

8. The method of claim 1, further comprising:
   detecting motion in a first frame of the video feed; and
   determining, based on the detected motion in the first frame, the probability of the object being present in a second frame of the video, and
   wherein the second frame is selected as the second portion of the video feed.

9. The method of claim 1, further comprising detecting the object in a region of a first frame of the video feed, and
   wherein selecting the first portion of the video feed and the second portion of the video feed comprises selecting the second portion of the video feed to include a region of a second frame that is proximate to the region of the first frame, wherein the second frame is subsequent in time to the first frame.

10. The method of claim 1, wherein the first portion includes the second portion.

11. The method of claim 1, wherein the object is a face, wherein the first detection algorithm is a first facial detection algorithm, and wherein the second detection algorithm is a second facial detection algorithm.

12. The method of claim 1, wherein the video feed is a live video feed.

13. The method of claim 1, wherein the video feed is a recorded video feed.

14. A system for selectively applying multiple object detection algorithms, the system comprising:
   one or more computers; and
   a computer-readable medium coupled to the one or more computers having instructions stored thereon which, when executed by the one or more computers, cause the one or more computers to perform operations comprising:
      receiving a video feed of a scene;
      obtaining a probability model of the scene in the video feed, wherein the probability model is based on historical detections of an object within the scene;
      determining a probability of the object being present in a first portion of the video feed and a probability of the object being present in a second portion of the video feed based on the probability model of the scene in the video feed;
      selecting the first portion of the video feed and the second portion of the video feed based on the probability of the object being present in the first portion of the video feed compared to the probability of the object being present in the second portion of the video feed;
   wherein the probability of the object being present in the second portion of the video feed is greater than the probability of the object being present in the first portion of the video feed;
      processing a first portion of the video feed using a first detection algorithm to detect the object in the first portion of the video feed; and
      processing a second portion of the video feed using a second detection algorithm to detect the object in the second portion of the video feed,
      wherein the first detection algorithm is different from the second detection algorithm, and
      wherein the probability model includes a spatial probability model, that maps probabilities of detecting the object to regions within the scene, and a temporal probability model that maps probabilities of detecting the object to time periods.

15. A non-transient computer readable storage device storing instructions that, when executed by at least one processor, cause the at least one processor to perform operations comprising:
   receiving a video feed of a scene;
   obtaining a probability model of the scene in the video feed, wherein the probability model is based on historical detections of an object within the scene;
   determining a probability of the object being present in a first portion of the video feed and a probability of the object being present in a second portion of the video feed based on the probability model of the scene in the video feed;
   selecting the first portion of the video feed and the second portion of the video feed based on the probability of the object being present in the first portion of the video feed compared to the probability of the object being present in the second portion of the video feed;
   wherein the probability of the object being present in the second portion of the video feed is greater than the probability of the object being present in the first portion of the video feed;
   processing a first portion of the video feed using a first detection algorithm to detect the object in the first portion of the video feed; and
   processing a second portion of the video feed using a second detection algorithm to detect the object in the second portion of the video feed,
   wherein the first detection algorithm is different from the second detection algorithm, and
   wherein the probability model includes a spatial probability model, that maps probabilities of detecting the object to regions within the scene, and a temporal probability model that maps probabilities of detecting the object to time periods.

* * * * *